United States Patent
Bussey, Jr. et al.

[11] Patent Number: 5,860,413
[45] Date of Patent: Jan. 19, 1999

[54] POOL COVER

[75] Inventors: Harry Bussey, Jr., Marco Island, Fla.; Edward J. Ellison, Oakland, N.J.

[73] Assignee: CPI Packaging, Inc., Marlboro, N.J.

[21] Appl. No.: 180,423

[22] Filed: Jan. 12, 1994

[51] Int. Cl.[6] ...................................... F24J 2/42
[52] U.S. Cl. ................ 126/565; 126/564; 126/561; 126/566; 4/499; 4/498; 4/502
[58] Field of Search .................. 126/565, 561, 126/564, 566; 4/499, 498, 502

[56] References Cited

U.S. PATENT DOCUMENTS

| | | | |
|---|---|---|---|
| 3,893,443 | 7/1975 | Smith | 126/565 |
| 4,079,726 | 3/1978 | Voelker | 126/566 |
| 4,103,368 | 8/1978 | Lockshaw | 126/566 |
| 4,146,015 | 3/1979 | Acker | 126/565 |
| 4,313,421 | 2/1982 | Trihey | 126/566 |
| 4,426,995 | 1/1984 | Wilson | 126/566 X |
| 4,601,072 | 7/1986 | Aine | 4/499 |
| 4,709,688 | 12/1987 | Paradis | 126/566 |

FOREIGN PATENT DOCUMENTS

| | | | |
|---|---|---|---|
| 1171753 | 7/1984 | Canada | 126/565 |
| 2717070 | 10/1977 | Germany | 126/566 |
| 68061 | 12/1981 | Japan | 126/565 |
| 2025602 | 1/1980 | United Kingdom | 126/565 |

*Primary Examiner*—Larry Jones
*Attorney, Agent, or Firm*—Claire Ann Koegler

[57] ABSTRACT

The pool cover is made of multi-layer light weight construction having a transparent top layer to permit sunlight to pass through and an opaque bottom layer for absorbing sunlight passing through the transparent layer. In addition, a plurality of pockets are formed in the opaque layer having air encapsulated therein. When in use, the opaque layer becomes heated by sunlight thereby transferring heat by contact to the body of water in the pool. The heated trapped air also serves to conduct heat to the body of water while also acting as a thermal insulation barrier during non-daylight hours.

14 Claims, 1 Drawing Sheet

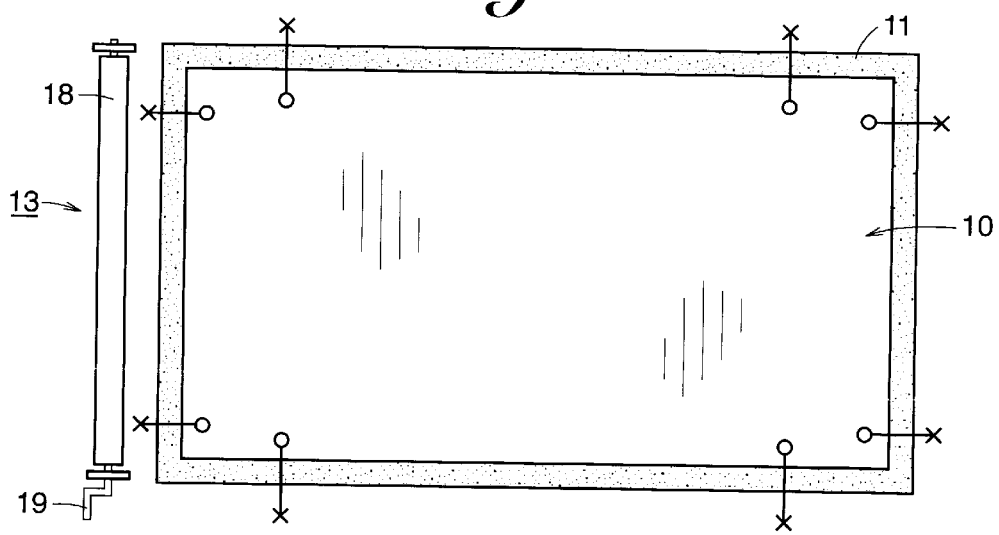
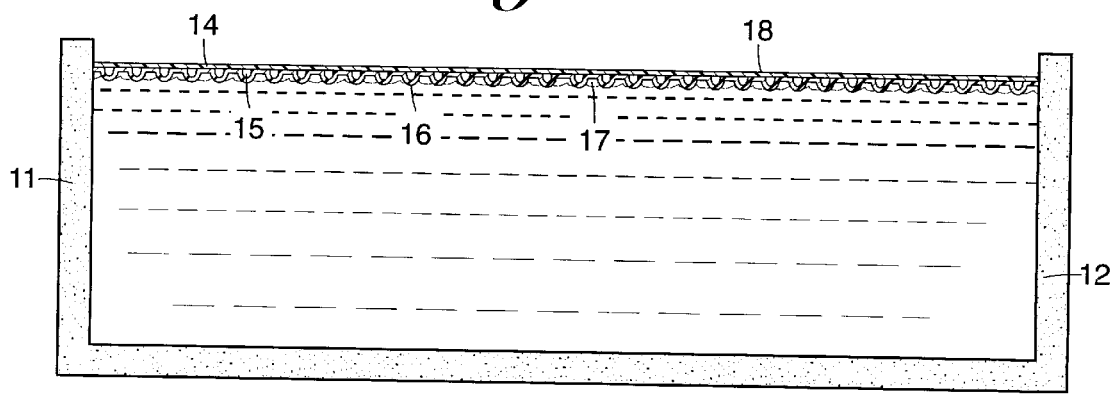
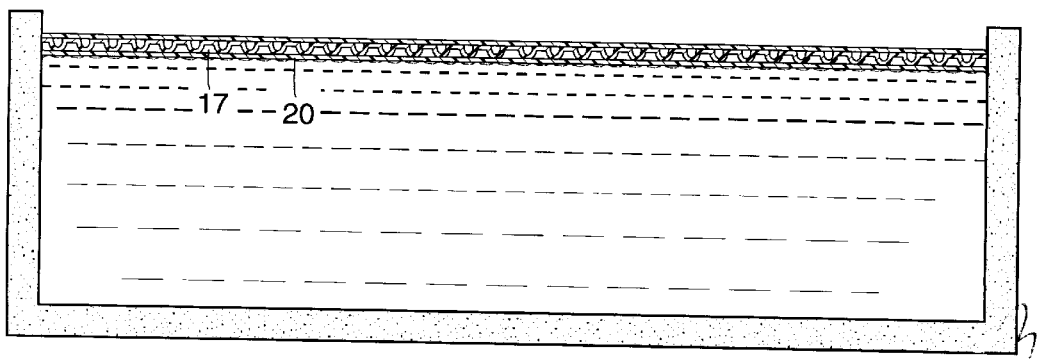

POOL COVER

BACKGROUND OF THE INVENTION

This invention relates to pool cover. More particularly, this invention relates to a solar pool cover.

As is known, various types of pool covers have been employed for covering over swimming pools and the like. In some cases, a tarpaulin-like cover has been employed to cover over a swimming pool when the pool is not in use in order to prevent debris and the like from falling into the water contained within the pool. Typically, these covers are of relative heavy weight construction.

1. Field of the Invention

In cases where a swimming pool is heated, use has been made of covers which are constructed to retain as much heat as possible within the body of water within the pool. For example, some pool covers have used a combination of glass and aluminum in an attempt to conserve heat within the pool. However, the use of such materials can be dangerous while being difficult to handle, for example, there is a potential danger of glass breakage while the incompatibility of chlorine with aluminum dictates against the use of such a cover for swimming pool applications.

2. Description of the Prior Art

Other types of pool covers have been of the solar type. For example, U.S. Pat. No. 3,072,920 describes a swimming pool cover for collection or reflection of solar heat in which the cover is made of a sheet of plastic material having a bottom surface covered with a layer of dark-colored material for the absorption of solar energy and an upper surface covered by a reflective surface, such as aluminum. In addition, an over-layer of transparent plastic material is attached to the marginal edge of the plastic sheet to form air-filled compartments or pockets to increase the buoyancy of the cover. In the summer, the cover is to be turned so that the dark absorptive surface is down facing the water with the aluminized surface facing the sky to reflect the sun's radiant energy. In the winter, the cover is to be reversed so that the dark surface is exposed to solar energy.

U.S. Pat. No. 4,146,015 describes a solar pool heater which employs a membrane having a smooth side and a pebbled side wherein each of the "pebbles" is a sealed air pocket. The entire membrane is transparent to permit the transmission of radiant energy to heat the underlying water and pool bottom.

U.S. Pat. No. 4,426,995 describes a solar quilt for heating a swimming pool. The quilt is described as having an upper film formed of semi-hemispherical modules which abut and are sealed to a lower film. The upper film is described as transmissive of downwardly directed solar radiation and reflective of upwardly directed radiant energy in the ultraviolet range. The lower film is said to be absorptive of incident solar energy.

U.S. Pat. No. 4,709,688 describes an opened cell sheeting for use as a covering for swimming pool surfaces. In addition, reference is made to previously known sealed cell pool covers which include an upper plastic sheet with dimples and a plastic sheet bonded to the upper sheet.

U.S. Pat. No. 3,022,781 describes a heater made of plastic film layers wherein a lower layer is made absorbent to radiant energy by being painted black or by incorporating a black pigment within the plastic composition.

U.S. Pat. No. 3,893,443 describes a floating pool heater employing individual unit heaters which are capable of floating. In addition, each unit has a bottom wall with a blackened surface on the inside.

Generally, the previously known structures are of relatively thick, heavy weight construction. Further, in some cases, the covers which have been made of lightweight materials have tended to be of a transparent nature such that heat energy in a covered pool is permitted to radiate out of the pool through the cover during dark periods. Also, where the covers have been transparent, a portion of the heat band is reflected without being converted to heat in the pool water. In addition, algae growth is promoted in and on the pool surfaces due to the passage of light into the water below the cover.

Accordingly, it is an object of the invention to provide a pool cover which has good insulating qualities with enhanced heat transfer into a body of water in a pool.

It is another object of the invention to provide a pool cover which is of light weight construction and which can be easily handled.

It is another object of the invention to provide a pool cover which has an efficient heat transfer quality.

It is another object of the invention to provide a pool cover which can be made of recycled plastic materials.

It is another object of the invention to provide a pool cover which eliminates algae growth while the cover is on a swimming pool.

It is another object of the invention to reduce the need for chemicals in maintaining a swimming pool.

It is another object of the invention to provide a pool cover of low cost construction.

It is another object of the invention to provide less filter run time with corresponding reduced pump run time which, in turn, reduces the amount of electric power needed.

BRIEF SUMMARY OF THE INVENTION

Briefly, the invention provides a pool cover which is comprised of a first transparent or translucent layer for passing sunlight therethrough and a second opaque layer secured to the first layer for absorbing sunlight passing through the transparent or translucent layer. In addition, at least one of the layers has a plurality of pockets therein facing the other layer and which are sealed relative to the other layer to encapsulate air therein. The construction is such that sunlight passing through the first transparent or translucent layer heats the opaque layer and the air in the pockets and transfers the heat to the pool water under the opaque layer. The air trapped in the pockets forms an insulating barrier for heat attempting to escape up through the cover while the opaque layer eliminates or greatly reduces the evaporation from the pool surface.

The cover serves to form an insulating barrier during periods of darkness, such as nighttime hours, or cool day conditions in order to conserve heat within a heated body of water within a swimming pool. This is accomplished in two ways. First, during sunlight hours, the heat rays of the sun impinging on the transparent or translucent top layer pass through and strikes the bottom opaque layer and are converted to heat. The circulating pool water then absorbs the heat either by touching the opaque layer or by conduction from the super hot air trapped in the air pockets. Second, the pool cover serves to eliminate evaporation from the pool water while in place on the pool surface.

It has been known that a transparent or translucent cover will help promote the growth of algae due to the light which passes through the cover coupled with the rise in pool water temperature. During daylight hours, the opaque bottom layer of the pool cover blocks the light which is necessary for algae growth. Coupled with the evaporation preventing characteristics of the pool cover, the need for pool chemicals and water replacement becomes greatly diminished.

In one embodiment, the pockets which may be of semi-spherical shape are formed in the opaque second layer.

In another embodiment, a third layer is secured to the bottom of the second layer so that the second layer becomes sandwiched between the top transparent layer and the bottommost third layer.

The construction of the pool cover is such that each layer may be made of a suitable light weight plastic material, such as polyvinyl-chloride, polystyrene, polyethylene or polypropylene. In addition, the overall pool cover is flexible so as to permit rolling up on itself.

Still further, the entire cover may be made of recycled plastic material which is less costly. In this regard, the opaque layer may be made black in color although any other dark color may be used.

BRIEF DESCRIPTION OF THE DRAWINGS

These and other objects and advantages of the invention will become more apparent from the following detailed description taken in conjunction with the accompanying drawings wherein:

FIG. 1 illustrates a pool cover disposed over a pool in accordance with the invention;

FIG. 2 illustrate a cross-sectional view of the pool cover floating on a body of water within the pool; and FIG. 3 illustrates a cross-sectional view of a modified pool cover constructed in accordance with the invention.

DETAILED DESCRIPTION OF THE INVENTION

Referring to FIG. 1, the pool cover 10 is of rectangular shape or shaped to fit the pool configuration and is disposed in floating relation on a body of water 12 (see FIG. 2) within the pool 11. A means 13 is also positioned adjacent to the pool 11 for winding of the pool cover 10 thereon when not in use.

Referring to FIG. 2, the pool cover 10 is of flexible construction and is made of two layers 14, 15, for example, of a plastic material, such as polyvinylchloride, or other suitable materials.

The top layer 14 is transparent (or translucent) and allows sunlight to pass therethrough. As indicated, the transparent or translucent layer 14 is of planar shape and is of a thickness of, for example, from 1 to 20 mil.

The bottom layer 15 is opaque and is of a thickness of, for example, from 2 to 20 mil. depending on the life expectancy. This opaque layer 15 is secured to the transparent layer 14 in any suitable fashion. For example, the opaque layer 15 may be bonded to the transparent layer 14. In addition, the opaque layer 15 has a plurality of semi-spherical pockets 16 formed therein in facing relation to the transparent layer 14. These pockets 16 are sealed relative to the transparent layer 14 so as to encapsulate air therein.

As indicated in FIG. 2, the encapsulated air pockets 16 are partially submerged in the body of water 12 so that additional air pockets 17 are formed between the bottom surfaces of the opaque layer 15 between the pocket 16 and the surface of the body of water 12.

The pool cover 10 may be made in any suitable fashion. For example, a planar sheet of opaque material may be passed over a roller which has recesses therein so that the pockets can be formed by being drawn into the recesses. Alternatively, the sheet of opaque material may be passed over a roller provided with projections of semi-spherical shape which serve to deform the sheet to form the pockets. Thereafter, a transparent or translucent layer and the formed opaque layer can be brought into mutual contact and sealed relative to each other so as to entrap air within the pockets 16. The resulting multi-layered sheet can then be cut into suitable widths or lengths for the formation of the pool cover 10. In this respect, a pool cover 10 may be made of one continuous length and width or may be made of sections which are secured together in a suitable manner (not shown).

The means 13 for winding up of the pool cover 10 may in the form of a take-up roller 18 which is rotatably mounted on suitable supports at opposite ends and a handle 19 for turning of the take-up roller 18. In addition, a suitable clamping device (not shown) or adhering device (not shown) may be employed on the roller 18 so as to grip one end of the cover 10 so that subsequent turning of the roller 18 causes the remainder of the pool cover 10 to be wound up on the roller 18.

In the event that the pool is of relatively wide width, use may be made of multiple pool covers in side-by-side relation. In this case, a plurality of means 18 may be employed for winding up the respective covers.

The pool cover 10 may be finished off along the edges with suitable grommets (not shown) so that the pool cover 10 can be secured to suitable anchorages along the sides of the pool 11. In this respect, the grommets may be secured directly in and along the sides of the pool cover 10 or may be formed within reinforcing strips of fabric or plastic which can be separately secured to the edges of the pool cover 10.

Further, where the pool cover is made of sections, similar grommets may be used along abutting and overlapping edges of the sections to facilitate securement of the sections together in an overlapping manner via suitable fasteners.

The pool cover may also be of other shapes than rectangular and may be custom-shaped to the shape of a given pool.

When in use, the pool cover 10 is laid over the body of water 12 in the swimming pool 11 during cool periods or during nighttime periods in order to conserve the heat within the body of water 12.

During day time, sunlight which impinges on the pool cover 10 passes through the transparent layer 14 to heat the opaque layer 15 which, in turn, serves to transfer the heat by contact directly to the body of water 12. Typically, the pool 11 is provided with recirculation equipment so that the hotter water which is at the top of the pool can be cycled to the bottom of the pool whereby the cooler water at the bottom of the pool rises to the top to be heated by the cover 10.

At the same time as the opaque layer 15 is being heated by sunlight, the air encapsulated within the pockets 16 is also heated. Thus, during non-daylight hours, the encapsulated air acts as a thermal barrier to the passage of heat upwardly from the cover 10. That is to say, the heat from the opaque layer 15 and the heat from within the body of water 12 is retarded from passing upwardly through the pool cover 10.

In addition, the air pockets 17 between the pool cover 10 and body of water 12 become heated and serve as thermal insulation during non-sunlight hours.

Since the opaque layer 15 serves to block passage of sunlight into the body of water 12, algae growth is inhibited in the water and on the sides of the pool 18. This, in turn, leads to a reduction in the need for chemicals in the water to suppress algae growth. Further, since the layer 15 is opaque, there is no need to incorporate an ultraviolet light inhibitor in the plastic material of the layer.

Referring to FIG. 3, wherein like reference characters indicate like parts as above, the pool cover 10' may be constructed with a third layer 20 of similar plastic material to the opaque layer 15 with a thickness of from 1 to 20 mil. In this case, the third layer 20 is planar and is bonded to the pockets 16 so that the pockets 17 become sealed with encapsulated air therein i.e. with the peripheral edges of the third layer 20 bonded to the edges of the opaque layer 15. This construction can be readily made by sandwiching the opaque layer 15 between the top and bottom layers 14, 20 in known manner.

The added bottom layer 20 may also be made of opaque material so as to be heated by conduction via the opaque layer 15.

Referring to FIG. 1, in order to remove the pool cover 10 from over the water in the pool 11, one end of the cover 10 is secured to the take-up roller 18 and, thereafter, the roller 18 is rotated so as to wind up the remainder of the pool cover 10. Since the pool cover 10 is of relatively light weight construction, the pockets 16 in the opaque layer 15 retain their shape without collapsing. Further, since the cover 10 is made of plastic material, a minimum amount of water is retained on the cover 10 so as to not impede the winding up of the pool cover 10 on the roller 18.

The invention thus provides a pool cover of relatively light weight. For example, the cover may have a weight of from 1 to 10 pounds per hundred square feet.

Further, the invention provides a cover which can be readily manufactured and installed in place. Likewise, the pool cover can be readily wound up on itself for storage purposes when not in use.

By way of example, a pool cover constructed as shown in FIGS. 1 and 2 was compared with a conventional translucent aqua colored bubble cover of known construction. In this respect, two four foot round pools, each approximately one (1) foot deep and each equipped with a recirculating pump was used for the test. The pool cover of FIGS. 1 and 2 was placed over one pool with the second pool being covered by the conventional bubble cover. Both pools were subjected to the same sun and wind conditions.

The results obtained show that the pool cover of FIGS. 1 and 2 absorbed more heat than the conventional bubble pack cover; and that the use of recycled materials reduced the cost of manufacture while also reducing pollutants. Also, the opaque layer which was black in the present test inhibited the growth of algae. Further, the pool water covered by the pool cover of FIGS. 1 and 2 was found to be consistently 4° warmer.

A second experiment was conducted on algae growth in an 18 foot by 36 foot deep hopper in-ground vinyl lined pool. In accordance with the test, the chlorine parts per million was allowed to drop to 0.2 and the temperature was raised to 90° F. After forty hours at these conditions, algae began to form on the vinyl liner. The black pool cover constructed in accordance with FIGS. 1 and 2 was then placed on the entire water surface for 48 hours. When the cover was removed, the algae was no longer visible.

When the pool cover 10 is not in use, the pool cover 10 may be wound up on the roller 18 as indicated in FIG. 1 or wound or folded on itself for storage purposes. In these conditions of non-use, a suitable light-reflective cover may be disposed over the wound-up pool cover 10 in order to prevent sunlight from heating the plastic of the pool cover 10. For example, where the pool cover 10 is wound up on a roller 18, a cover of white plastic may be placed over the rolled up pool cover 10 and tied into place using suitable ties. Any other suitable cover may also be used.

The invention further provides a pool cover which greatly reduces the need for chlorine and algaecides. Further, the reduced need for pool chemicals reduces the amount of pollutants released into the environment.

Still further, the use of the cover reduces the need for pump run time thereby saving electricity. This also increases the longevity of the pump and pump motor.

What is claimed is:

1. A pool cover comprising a first upper translucent lightweight flexible plastic layer for passing sunlight therethrough, said upper layer having a thickness between about 1 mil and about 20 mils;

a second underlying opaque lightweight flexible plastic layer secured to said first layer for absorbing sunlight passing through said first layer, said underlying layer having a thickness between about 2 mil and about 20 mils;

said second layer having a plurality of pockets therein facing said first layer and sealed relative to said first layer to encapsulate air therein to form an insulating barrier over a pool surface, to retain heat, to reduce evaporation from the pool surface, and to inhibit growth of algae; and said first layer being flat.

2. A pool cover as set forth in claim 1 which further comprises a third lightweight flexible plastic layer secured to said opaque layer, each of said first and third layers being flat to sandwich said second layer therebetween to encapsulate air between said second layer and said third layer, said third layer having a thickness between about 1 mil and about 20 mils.

3. A pool cover as set forth in claim 1 wherein each layer is made of a material selected from the group consisting of polyvinyl-chloride, polystyrene, polyethylene and polypropylene.

4. A pool cover as set forth in claim 1 wherein said first upper layer is transparent.

5. In combination a flexible multilayer pool cover including a top layer of translucent lightweight flexible plastic having a thickness between about 1 mil and about 20 mils, a second opaque layer of lightweight flexible plastic having a thickness between about 2 mils and about 20 mils for absorbing radiant heat and a plurality of air-encapsulating pockets disposed between said layers, wherein said pockets are formed in said second layer and said second layer floats in the body of water in the pool whereby trapped air is contained between the pool cover and the pool surface to provide further insulation and wherein said upper layer is flat; and means for positioning adjacent to a pool for winding and unwinding of said pool cover thereon and therefrom for selective disposition of said pool cover over and onto a body of water in the pool.

6. The combination as set forth in claim 5 wherein said pool cover is rectangular in shape and said means includes a portable take-up roller for winding of said pool cover thereon.

7. The combination as set forth in claim 5 wherein said pool cover further includes a third lightweight flexible plastic layer having a thickness between about 1 mil and about 20 mils secured to said opaque layer and said third layer floats in the body of water in the pool, said third layer being flat and disposed on an opposite side of said second opaque layer from said top layer to encapsulate air between said second layer and said third layer and wherein said top layer is flat.

8. The combination as set forth in claim 5 wherein each layer is made of a material selected from the group consisting of polyvinyl-chloride, polystyrene, polyethylene and polypropylene.

9. The combination as set forth in claim 5 wherein said top layer of said pool cover is transparent.

10. A method for collecting heat, retaining heat, reducing evaporation, and reducing growth of algae in a pool comprising providing a first upper translucent lightweight flexible plastic layer for passing sunlight therethrough, said upper layer having a thickness between about 1 mil and about 20 mils;

securing to said first layer a second underlying opaque lightweight flexible plastic layer for absorbing sunlight passing through said first layer, said underlying layer having a thickness between about 2 mils and about 20 mils;

providing said second layer with a plurality of pockets therein facing said first layer and sealed relative to said first layer to encapsulate air therein, whereby sunlight passing through said first layer heats said second layer while the air in said pockets forms an insulating barrier over a pool surface, said combination of layers reduces evaporation from the pool surface, and said opaque layer reduces growth of algae, and wherein said first layer is flat.

11. A method in accordance with claim 10, which further comprises providing a third flat lightweight flexible plastic layer secured to said opaque layer to encapsulate air between said second layer and said third layer, said third layer having a thickness between about 1 mil and about 20 mils.

12. A method in accordance with claim 10, which further comprises providing means for positioning adjacent to a pool for winding and unwinding of said pool cover thereon and therefrom for selective disposition of said pool cover over and onto a body of water in the pool.

13. A method in accordance with claim 10, which further comprises constructing each layer of a material selected from the group consisting of polyvinyl-chloride, polystyrene, polyethylene and polypropylene.

14. A method in accordance with claim 10, wherein the step of providing a first upper layer is practiced by providing a transparent layer.

* * * * *